March 13, 1934.   T. M. DE LA GARDE   1,950,715
CAMERA
Original Filed Aug. 18, 1931
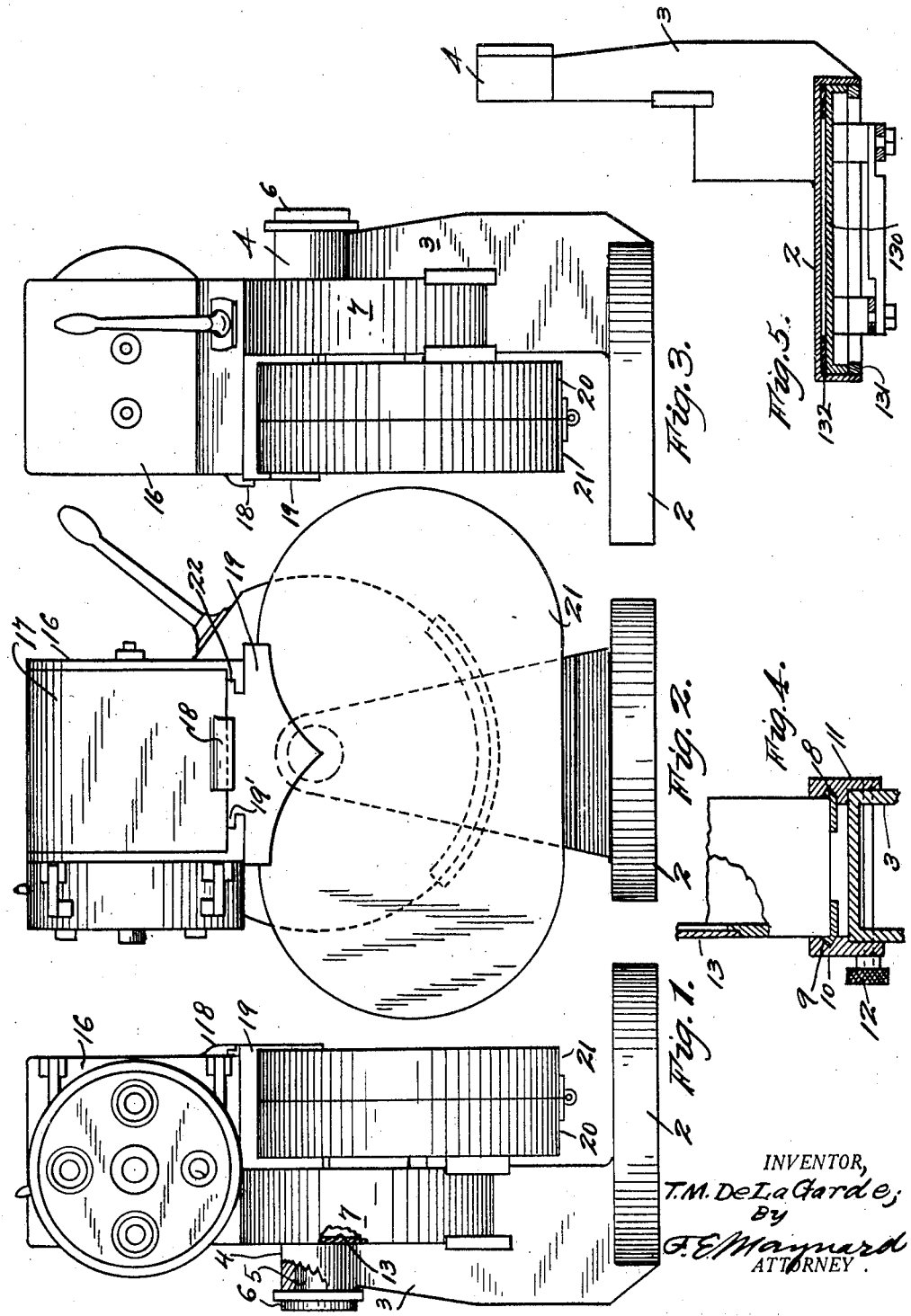
INVENTOR,
T. M. De La Garde,
By
G. E. Maynard
ATTORNEY.

Patented Mar. 13, 1934

1,950,715

UNITED STATES PATENT OFFICE 1,950,715

CAMERA

Theodor M. De La Garde, Los Angeles, Calif., assignor of three-fourths to Thomas L. Tally, Beverly Hills, Calif., Original application August 18, 1931, Serial No. 557,840. Divided and this application May 20, 1932, Serial No. 612,537

4 Claims. (Cl. 88—16)

This invention relates to cameras and especially to motion-picture cameras.

The invention has for an object the provision of a camera involving numerous material improvements giving the camera many valuable capacities and superior advantages in several particulars over previous motion-picture cameras.

A few of the objects and advantages will immediately be called to attention, and others will develop in the more detailed statement of the apparatus setting out the parts and functions thereof.

It is an object to so relatively arrange the housing compartments and the mechanism and film load as to secure a nice balance of the load on a horizontal axis, and an object is to provide for the ready and steady rotation of the photographing and magazine housing in an arc of more than 180° in a range from vertically downward to vertically upward without any movement of the supporting element about which the rotation takes place. There is thereby obtained great facility and capacity for taking pictures from ground view to sky view by a mere sweep of the lens in the desired arc. However, in this connection, a further object is to provide for concurrent vertical sweep and horizontal sweep, or, in other words, an arc which is oblique from ground to sky.

A desideratum is to so arrange the magazine that it is under the plane of the camera box or housing where it will not obstruct the photographer's line of vision about and above the camera box, and at the same time will effect the desired balance of weight as to the horizontal axis.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a front elevation of the camera.
Figure 2 is a left-hand side elevation.
Figure 3 is a rear view.
Figure 4 is a vertical, transverse section of the gear casing, and shows the casing friction clamp.
Figure 5 is a sectional detail of the turntable.

This application is a division of application Ser. No. 557,840, filed August 18, 1931, for a Motion-picture camera, and pertains especially to the peculiar combination of the camera and its magazine and mount as set forth in the said application.

The apparatus includes a turntable 2 with a rigid pillar 3 standing on one side of its top and providing a journal 4 in which is turnable a substantial trunnion 5 having a ring nut 6 on its outer end. The other end of the trunnion is fixed on the back of a circular housing part, herein called the casing 7, which encloses transmission means, for a description of which reference is made to the aforesaid application, and to the later continuing application Ser. No. 589,683, filed January 29, 1932, entitled Motion-picture camera.

The casing has V-shaped, segmental beads 8—9, Fig. 4, at its lower part; the bead 9 resting in a fixed way 10, and the bead 8 being engaged by a segment 11 clamped down by screw means 12 passing to the front of the pillar 3.

The trunnion 5 is on a cover plate 13, Fig. 4, of the gear casing, and this is secured to a box 16 forming the camera compartment of the housing, one side of which is closed by a side door 17 having a bottom lip 18 to close over a dome 19 of a sectional magazine 20—21. The dome has side flanges 19' adapted to slide into channels 22 provided therefor in the bottom of the box 16 where this overhangs the side of the gear casing 7.

Ready swivelling of the camera on an axis normal to the axis of the trunnion is had by means of a table bed 130 fitted in the turntable 2 for relative rotation and retained by a ring 131 threaded in the turntable flange. A friction washer 132 is interposed between the bed 130 and the turntable, and the ring 131 is adjustable to determine the turning resistance of the turntable.

The structural elements of the housing and its trunnion part and casing 7, and of the single magazine are so constructed, designed and arranged that the combined weight of swinging elements on one side of the trunnion axis is about equal to the weight of those on the opposite side of said axis so that the rotative unit is about counterpoised on the trunnion.

What is claimed is:

1. A motion picture camera assembly including a camera housing having a journal part and a trunnion support therefor with a horizontal axis and about which the housing may swing in a vertical arc of more than 180 degrees and the housing being wholly on one side of the trunnion axis, and a feeding and reeling magazine attached to the bottom of the housing in a position substantially wholly on the opposite side of the trunnion axis to counterbalance the housing; the latter having a focal axis unobstructed by the magazine at any position about the axis of rotation, the weight of the magazine and a portion of said journal part substantially equalling the weight of the housing and the remaining portion of the journal part on the opposite side of the trunnion axis.

2. In a motion picture camera, a support having a trunnion bearing with a horizontal axis, and a camera housing journaled on one side of the axis of the bearing for vertical rotation; said camera including a single magazine attached to the housing in a position unobstructive of the focal axis of the camera and being arranged at the opposite side of the bearing axis as to the housing so as to counterbalance the housing; the tilting parts of the magazine and the housing structure which are relatively on opposite sides of the trunnion axis being of substantially equal weight to effect the counterbalance.

3. In a camera, a turntable adapted to be attached to a tripod head and provided with a column having a trunnion bearing the axis of which is normal to the axis of the turntable, and a magazine assembly including a camera housing above the bearing axis and a single magazine rigidly attached to its bottom and substantially below said axis; said assembly having a trunnion part on said bearing; the tilting elements of the magazine and of the housing which are on opposite sides of the trunnion being of about equal weight whereby the housing and the magazine mutually counterbalance each other about the trunnion axis.

4. A motion picture apparatus comprising a support including a trunnion bearing, and a camera housing having attached to its bottom a magazine constructed and arranged to provide for unobstructed view finding through the camera on its focal axis, a casing attached to the bottom of the housing and rotatively bearing on said support and having a trunnion part on said bearing to provide for rotation of the housing and magazine assembly; and the housing and the magazine being substantially equipoised and relatively on diametrically opposite sides of the trunnion axis.

THEODOR M. DE LA GARDE.